United States Patent [19]
Sato et al.

[11] Patent Number: 5,384,215
[45] Date of Patent: Jan. 24, 1995

[54] POLYPYRROLE SHAPED MATERIAL, PROCESS FOR PRODUCTION THEREOF, AND SECONDARY BATTERY

[75] Inventors: Kazuhiko Sato; Tsuneo Hagiwara, both of Hino; Michio Yamaura, Hachioji, all of Japan

[73] Assignee: Teijin Limited, Osaka, Japan

[21] Appl. No.: 50,488

[22] PCT Filed: Nov. 14, 1991

[86] PCT No.: PCT/JP91/01559
§ 371 Date: May 13, 1993
§ 102(e) Date: May 13, 1993

[87] PCT Pub. No.: WO92/09112
PCT Pub. Date: May 29, 1992

[30] Foreign Application Priority Data

Nov. 16, 1990 [JP] Japan .................. 2-308546

[51] Int. Cl.[6] .............................. H01M 4/60
[52] U.S. Cl. ....................... 429/213; 205/58
[58] Field of Search .......... 429/213; 205/58, 924; 204/242, 248

[56] References Cited

U.S. PATENT DOCUMENTS

| | | | |
|---|---|---|---|
| 4,472,488 | 9/1984 | Maxfield et al. | 429/213 |
| 4,543,306 | 9/1985 | Bubols et al. | 429/213 X |
| 4,818,646 | 4/1989 | Takakubo et al. | 429/213 |
| 5,151,162 | 9/1992 | Müller et al. | 205/58 X |

FOREIGN PATENT DOCUMENTS

| | | |
|---|---|---|
| 59-166529 | 9/1984 | Japan . |
| 60-127663 | 7/1985 | Japan . |
| 60-216470 | 10/1985 | Japan . |
| 62-2468 | 1/1987 | Japan . |
| 62-165858 | 7/1987 | Japan . |
| 62-271345 | 11/1987 | Japan . |
| 63-48749 | 3/1988 | Japan . |
| 63-48750 | 3/1988 | Japan . |
| 2-119051 | 5/1990 | Japan . |

Primary Examiner—Stephen Kalafut
Attorney, Agent, or Firm—Wenderoth, Lind & Ponack

[57] ABSTRACT

A polypyrrole shaped material characterized in that when the polypyrrole shaped material is assembled into a tri-electrode cell comprising the polypyrrole shaped material as a positive electrode, platinum as a negative electrode, a lithium metal as a reference electrode and $LiClO_4$ or $LiBF_4$ as an electrolyte and said tri-electrode and cell are subjected to discharging at a current density of 10 mA/cm$^2$ and controlled-potential charging at 3.6 V, (i) at the completion of the discharging, the concentration of chlorine or fluorine in the polypyrrole shaped material is 30% or below of that at the completion of the charging, and (ii) at the completion of the charging, the distribution of chlorine or fluorine in the thickness direction of the polypyrrole shaped material is 50% or less. This polypyrrole shaped material enables charging and discharging at high current densities and has large charging and discharging capacities, and can therefore be utilized as an electrode for secondary battery.

8 Claims, 5 Drawing Sheets

POLYPYRROLE SHAPED MATERIAL, PROCESS FOR PRODUCTION THEREOF, AND SECONDARY BATTERY

This application is a national phase application, filed under 35 USC 371, of PCT/JP91/01559, published under International Publication Number WO 92/09112.

DETAILED DESCRIPTION OF THE INVENTION

The present invention relates to a polypyrrole shaped material suitable for use as an electrode for a secondary battery, a process for production thereof, and a secondary battery. More particularly, the present invention relates to a polypyrrole shaped material enabling charging and discharging at high current densities and having large charging and discharging capacities, a process for production thereof, and a secondary battery using said polypyrrole shaped material as an electrode.

DESCRIPTION OF RELATED ART

It is known that, in general, conducting polymers show high electrical conductivity and, moreover, can be oxidized and reduced electrochemically. It is further known that the oxidation or reduction reaction of a conducting polymer is accompanied by the outflow or inflow of the counter ion contained therein. Because of this function, conducting polymers are used as electrodes, and there have been proposed electrodes using a polypyrrole, a polythiophene, a polyaniline or the like.

When the conventionally proposed conducting polymers are used as electrodes, however, the electrodes have problems in that they allow neither charging nor discharging at high current densities and that they have no large charging and discharging capacities. In order to solve these problems, Japanese Patent Application Kokai (Laid-Open) No. 48749/1988 discloses an electrode obtained by polymerization under the application of full-wave-rectified voltage and Japanese Patent Application Kokai (Laid-Open) No. 48750/1988 discloses an electrode obtained by polymerization under the application of asymmetrical voltage. In these proposals, a polypyrrole or a polythiophene is mainly used as a conducting polymer.

In the conducting polymers obtained by the conventional controlled-current or controlled-potential polymerization, the properties are not uniform throughout the whole portion; when such a conducting polymer is used as an electrode of cell, the cell reaction takes place disproportionately in part of the electrode; tending to invite a rise in charging voltage at an early stage, resulting in reduction in charging and discharging capacities of the cell. In contrast, in the conduction polymers obtained by polymerization according to the above proposals, the above drawback has been alleviated.

Even the conducting polymers obtained according to the above proposals, however, are not sufficiently effective when produced in a thick film, although they are effective when produced in a thin film. That is, even the conducting polymers obtained according to the above proposals are not sufficiently free from a drawback that the charging and discharging accompanied by the outflow and inflow of counter ions proceed smoothly in the vicinity of the film surface but do not proceed smoothly within the film inside because the diffusion of counter ion is not smooth within the film inside and thus the charging and discharging take place disproportionately in the vicinity of the film surface. Generally in secondary batteries, in order to obtain large charging and discharging capacities with a small film area, there is used a thick film of 100 μm or more in thickness and, depending upon the case, of 1 mm in thickness. In secondary batteries using such a film thickness, it is therefore difficult to obtain sufficiently large charging and discharging capacities even when an improved electrode such as mentioned above is used. This is particularly noticeable when discharging is made at a high current density.

Meanwhile, Japanese Patent Application Kokai (Laid-Open) No. 2468/1987 proposes to form a conducting polymer film containing an ion of large ionic radius and assemble it into a cell using an ion of small ionic radius as an electrolyte. This proposal was made in order to achieve the smooth outflow and inflow of ions by using a counter ion of small size and resultantly conducts smooth charging and discharging.

The above proposal is effective to some extent in the case of a fibril-like highly porous coarse film such as the polyacetylene described in the present specification, because the electrolyte can easily diffuse and penetrate into the film. However, the proposal is not sufficiently effective in the case of dense film such as polypyrrole. As disclosed in the Examples of the present specification, when the doping level is as low as 10 mole % per pyrrole ring, even if a coulomb efficiency of 100% is obtainable, it is difficult to achieve charging and discharging corresponding to a high doping level of about 30 mole % per pyrrole ring which is a theoretical doping level of polypyrrole. That is, even if there occurs, at the film surface, charging and discharging corresponding to 30 mole % doping, substantially no charging and discharging take place within the film and there occurs, on average, charging and discharging corresponding to only about 10 mol % doping. This tendency is more noticeable when the film thickness is larger. In other words, when the film thickness is larger, the charging and discharging capacities per unit weight of polymer film are smaller.

Japanese Patent Application Kokai (Laid-Open) No. 119051/1990 proposes a polypyrrole synthesized using an ion having an ionic radius larger than that of the ion used in the invention described in the above-mentioned Japanese Patent Application Kokai (Laid-Open) No. 2468/1987. Even in this proposal, however, the discharging capacity at a high current density, of a thick film is considerably smaller than the value calculated from the theoretical value of doped polymer.

PROBLEMS THAT THE INVENTION INTENDS TO SOLVE

The first object of the present invention resides in providing a polypyrrole shaped material enabling charging and discharging at high current densities and having large charging and discharging capacities.

The second object of the present invention resides in providing a polypyrrole shaped material having a relatively large film thickness and yet having the above electrochemical properties.

Another object of the present invention resides in providing an industrial process for producing the above-mentioned polypyrrole shaped material.

Still another object of the present invention resides in providing a secondary battery produced using the above-mentioned polypyrrole shaped material.

Still other objects of the present invention will become apparent from the following description.

In order to achieve the above objects, the present inventors made extensive research on a method by which charging and discharging proceed smoothly even in a thick-film electrode using a dense film of polypyrrole or the like. As a result, it was found that in order to make smooth the outflow and inflow of counter ions, i.e. the diffusion of anions in charging and discharging, the uniform movement of counter ions inside polypyrrole alone is not sufficient and further, the replacement of large counter ions with small counter ions is not sufficient. It was found that these problems can be solved by producing a polypyrrole shaped material while intermittently repeating electrolytic polymerization of pyrrole in the presence of a large counter ion, i.e. conducting the inflow and outflow of a counter ion and then replacing the large counter ion in a polypyrrole shaped material with a small ion by an electrochemical or chemical method.

MEANS FOR SOLVING THE PROBLEMS

It has been found by the research at the present inventors that the above-mentioned objects and advantages of the present invention can be achieved by a polypyrrole shaped material characterized in that when the polypyrrole shaped material is assembled into a tri-electrode cell comprising the polypyrrole shaped material as a positive electrode, platinum as a negative electrode, a lithium metal as a reference electrode and $LiClO_4$ or $LiBF_4$ as an electrolyte and said tri-electrode cell is subjected to discharging at a current density of 10 $mA/cm^2$ and controlled-potential charging at 3.6 V, (i) at the completion of the discharging, the concentration of chlorine or fluorine in the polypyrrole shaped material is 30% or below of that at the completion of the charging, and (ii) at the completion of the charging, the distribution of chlorine or fluorine concentration in the thickness direction of the polypyrrole shaped material, defined by the following formula is 50% or less:

distribution of chlorine or fluorine
concentration = $[(Imax - Imin)/Imax] \times 100$ (%)

wherein Imax is the maximum chlorine or fluorine concentration in the thickness direction of the shaped material, and Imin is the minimum chlorine or fluorine concentration in the thickness direction of the shaped material.

The polypyrrole shaped material of the present invention has a thickness of about 50 μm to about 2,000 μm.

When the thickness is less than 50 μm, it is impossible to obtain large charging and discharging capacities with a small area. Meanwhile, when the thickness is 2,000 μm or more, the diffusion of counter ion in the film inside is not smooth, making difficult charging charging and discharging at high current densities. The preferable thickness of the polypyrrole shaped material is about 100–about 2,000 μm.

In the present invention, the tri-electrode cell used for measurement of the chlorine or fluorine concentration and the distribution of said concentration in a polypyrrole shaped material is a cell constituted by three electrodes consisting of a positive electrode, a negative electrode and a reference electrode. In this cell, polypyrrole shaped material of oxidized state is reduced during the discharging and electricity flows from the positive electrode to the negative electrode. Conversely, during the charging, electricity flows into the polypyrrole shaped material of reduced state, whereby the polypyrrole shaped material is oxidized. During the charging, the positive electrode can be kept at a given potential (oxidizing potential) required for the oxidation of the polypyrrole shaped material using the reference electrode, whereby it can be prevented that the positive electrode reaches an unnecessarily high potential (overpotential).

When this tri-electrode cell is subjected to discharging at a current density of 10 $mA/cm^2$, the chlorine or fluorine concentration in the polypyrrole shaped material of the present invention used in the positive electrode, at the completion of the discharging is 30% or less, preferably 25% or less of that at the completion of the charging. That is, during the discharging, the polypyrrole shaped material is reduced and converted from a cation type to a neutral type. Simultaneously, the anion (counter ion) cancelling the cation, i.e., the $ClO_4^-$ or $BF_4^-$ present in the polypyrrole shaped material, is released into the electrolyte. When the tri-electrode cell is subjected to controlled-potential charging at 3.6 V, the distribution of chlorine or fluorine concentration in the thickness direction of the shaped material, defined by formula (1) is 50% or less, preferably 30% or less at the completion of the charging, and the chlorine or fluorine concentration at the completion of the charging, expressed as the concentration of $ClO_4^-$ or $BF_4^-$ (referred to as "reduced anion concentration") is at least $1.7 \times 10^{-3}$ mole/g resin, preferably at least $1.8 \times 10^{-3}$ mole/g resin. That is, during charging, the polypyrrole shaped material is oxidized and converted from a neutral type to a cation type. Simultaneously, the $ClO_4^-$ or $BF_4^-$ present in the electrolyte diffuses into the shaped material. Hence, in order for the charging to proceed smoothly, it is necessary that the $ClO_4^-$ or $BF_4^-$ diffuse smoothly into the internal portion of the shaped material inside. As a result, the distribution of chlorine or fluorine concentration in the shaped material becomes even as mentioned above. When the diffusion is not smooth, only the surface of the shaped material is charged and, as a result, the chlorine or fluorine concentration is high only in the vicinity of said surface and the distribution thereof is not even. In general, polypyrrole shaped materials obtained by electrolytic polymerization contain about 0.3 anion per pyrrole ring and the anion concentration in said shaped material is $3.4 \times 10^{-3}$ mole/g resin.

When the polypyrrole shaped material of the present invention, is assembled into a tri-electrode cell and the cell is subjected to the above-mentioned controlled-potential charging, the distribution of chlorine or fluorine concentration in the thickness direction of the shaped material is 50% or less and the reduced anion concentration at the completion of the charging is in the range of $1.7 \times 10^{-3}$–$3.4 \times 10^{-3}$ mole/g resin.

When the reduced anion concentration in the polypyrrole shaped material is less than $1.7 \times 10^{-3}$ mole/g resin, it is impossible to obtain charging and discharging properties which are appropriate for practical application. In other words, it is impossible to take out a sufficiently large quantity of electricity or to store a quantity of electricity corresponding to the discharging capacity.

The measurement of the chlorine or fluorine concentration and the distribution thereof during charging and discharging was made using an X-ray microanalyzer (XMA). Incidentally, the X-ray microanalyzer is also called electron probe microanalyzer (EPMA).

In the present invention, the distribution of chlorine or fluorine concentration in the thickness direction of the polypyrrole shaped material, defined by the following formula is 50% or less, as mentioned above:

distribution of chlorine or fluorine
concentration = $[(Imax - Imin)/Imax] \times 100(\%)$ wherein Imax is the maximum chlorine or fluorine concentration in the thickness direction of the shaped material, and Imin is the minimum chlorine or fluorine concentration in the thickness direction of the shaped material.

The concentration of chlorine or fluorine in the thickness direction of the polypyrrole shaped material, as measured by an X-ray microanalyzer, is shown in the form of a distribution diagram as shown in FIG. 2, FIG. 4, (FIG. 6), FIG. 8, FIG. 9 and FIG. 10. FIG. 6 is for a Comparative Example, and the other figures are chlorine distribution diagrams of polypyrrole shaped materials belonging to the present invention.

In these diagrams each showing the distribution of chlorine or fluorine concentration in the thickness direction of a polypyrrole shaped material, measured by an X-ray microanalyzer, the concentrations of chlorine or fluorine in both surfaces (the right and left sides of each diagram) of each polypyrrole shaped material film are zero or very small values owing to a problem in measurement when an electron-beam is applied. However, the concentrations of chlorine or fluorine in the vicinities of both surfaces of each film (particularly in the vicinity of the surface where the outflow and inflow of ions take place; at the right side of each diagram) are presumed to be about the same as the concentrations of chlorine or fluorine at the portions about 20-30 μm inside the surface.

In the present invention, the distribution of chlorine or fluorine concentration in the thickness direction of the polypyrrole shaped material is determined by reading Imax and Imin from the distribution diagram obtained using an X-ray microanalyzer and then applying these values into the formula shown above. However, the concentration of chlorine or fluorine in the vicinities of both surfaces of a film, are not read from the distribution diagram owing to the reason mentioned above.

In the present invention, in actual practice, the concentration of chlorine or fluorine is read, in a distribution diagram, along the thickness direction of a film of a polypyrrole shaped material for the about 30%–about 70% portion from the film surface (the film thickness is taken as 100), after which calculation is made using the obtained Imax and Imin to obtain a distribution of chlorine or fluorine concentration. In most cases, the chlorine or fluorine concentration may be read preferably for the about 20%–about 80% portion from the film surface. In the polypyrrole shaped material of the present invention, at the completion of the charging, the above-mentioned distribution of chlorine or fluorine concentration is 50% or less, preferably 30% or less and, as shown in the Figures, chlorine or fluorine is distributed at an almost constant level and at high concentrations in the thickness direction.

As mentioned above, the polypyrrole shaped material of the present invention has large charging and discharging capacities and enables charging and discharging at high current densities. Therefore, when mounted on an electrode substrate and used as a secondary battery, the polypyrrole shaped material can provide a battery of very high properties. The polypyrrole shaped material of the present invention can be advantageously used in such specific applications as an electrode for battery, an electrode for display device and an electrode for sensor.

It has been found by the research by the present inventors that the above polypyrrole shaped material having excellent electrochemical properties can be obtained by a process for producing a polypyrrole shaped material, which is characterized by (a) dipping an electrode substrate in a solution containing pyrrole and a supporting salt consisting of a cation and an anion having a molecular weight of 150 or more and a large ionic size, and conducting electrolytic polymerization to form a thin film on the substrate, (b) then conducting an undoping treatment at a potential not higher than the reducing potential, (c) and repeating the thin film formation by electrolytic polymerization of the step (a) and the undoping treatment of the step (b) at least 2 times until a polypyrrole shaped material of desired film thickness can be formed on the substrate.

According to the above process of the present invention there can be formed a polypyrrole shaped material which is doped with the anion of the above-mentioned supporting salt in such a state that the anion can easily leave the polypyrrole or penetrate thereinto and which has a sufficient thickness suitable for use as an electrode for a polymer secondary battery. Thereafter, an anion (counter ion) having an ionic size sufficiently smaller than that of the anion of the supporting salt can be introduced into the polypyrrole substrate to replace the anion of the supporting salt. In this case, it is desirable that about 50% or more, preferably about 60% or more of the supporting salt be replaced with an anion (counter ion) of small ionic size.

The polypyrrole constituting the polypyrrole shaped material is a conjugated conducting polymer obtained by electrolytic polymerization of a unsubstituted and/or substituted 5-membered heterocyclic pyrrole. As the pyrrole having substituent(s), there can be mentioned pyrroles whose 3- and/or 4-position is substituted with an alkyl group, an alkoxy group, a carbonyl group, a carboxymethyl group, a phenyl group, etc. It is possible to use, as a component copolymerizing with the pyrrole, a compound such as azulene, terthiophene or the like. Polymerization may be conducted in the presence of fine carbon particles, a metal oxide (e.g. manganese dioxide) or the like, all of which are used in a suspended state.

The polypyrrole shaped material of the present invention can be obtained by dipping an electrode substrate for polymerization in a solution containing pyrrole and a supporting salt comprising a cation and an anion having a molecular weight of 150 or more and a large ionic size and then conducting electrolytic polymerization. The anion of large ionic size is taken into the polypyrrole shaped material as a counter ion at the time of production of the shaped material, but can be removed by an undoping treatment.

The ionic size of the anion of the supporting salt used in electrolytic polymerization is preferably at least 8 Å. Herein the ionic size of the anion is the length of the anion molecule (containing an ionized atom) as measured in the long axis direction.

Further, it is necessary that the molecular weight of the anion of the supporting salt be 150 or larger, preferably 170 or larger, more preferably 200 or larger. When the molecular weight of the anion is smaller than 150, the anion has an insufficient ionic size and, as a result, the speed of diffusion of anions in polypyrrole shaped material is not sufficiently large.

As the anion of large ionic size constituting the supporting salt, there are mentioned a perfluoroalkanesulfonic acid ion represented by $C_nF_{2n+1}SO_3^-$ (n=4-12), an alkanesulfonic acid ion represented by the general formula $C_nH_{2n+1}SO_3^-$ (n=4-12), a perfluoroalkyl sulfate ion represented by the general formula $C_nF_{2n+1}OSO_3^-$ (n=4-12), an alkylsulfate represented by the general formula $C_nH_{2n+1}OSO_3^-$ (n=4-12), ions of aromatic sulfonic acids (e.g., unsubstituted and substituted benzenesulfonic acids, naphthalenesulfonic acid), etc. As carboxylic acids, there are mentioned unsubstituted and substituted benzoic acids. Of these, more preferable are, in view of the ionic sizes and shapes, alkylbenzenesulfonic acids such as toluenesulfonic acid, p-tert-butylbenzenesulfonic acid, 2,4,6-triisopropylbenzenesulfonic acid, octylbenzenesulfonic acid, dodecylbenzenesulfonic acid and the like; methoxybenzenesulfonic acid; 5-sulfoisophthalic acid; dimethyl 5-sulfoisophthalate; dihydroxyethyl 5-sulfoisophthalate; naphthalenesulfonic acid; and so forth.

As the supporting salt containing the above anion as a constituent, there are mentioned salts with a tetraalkylammonium ion such as tetramethylammonium ion, tetraethylammonium ion, tetrapropylammonium ion, tetrabutylammonium ion or the like, which is a counter cation to the anion; salts of alkali metal (e.g. Li, Na, K) ions; and so forth.

In producing the polypyrrole shaped material of the present invention, electrolytic polymerization is first conducted in a given small proportion to form a film which is very thin for use as an electrode for a polymer secondary battery, and then an undoping treatment is conducted. In this case, there is formed, per one cycle, a polypyrrole film as thin as 0.1-50 μm, preferably 0.3-30 μm on an electrode substrate; then, an undoping treatment is conducted at or below the reducing potential. When a thick film of 50 μm or more is formed per one cycle, charging and discharging proceed smoothly in the vicinity of the film surface but the diffusion of counter ion is not smooth inside the film. In the present invention, the above operation is repeated at least 2 times, whereby a film having a thickness usable as an electrode is synthesized.

The formation of a polypyrrole shaped material by electrolytic polymerization according to the present invention is conducted in a solvent. As the solvent, there are used, for example, acetonitrile, benzonitrile, water, propylene carbonate, ethylene carbonate, nitrobenzene, tetrahydrofuran, nitromethane, sulfolane, dimethoxyethane, etc., and mixed solvents thereof.

The electrode used in electrolytic polymerization has no particular restriction, either. However, there are used metals such as platinum, palladium, gold, copper, nickel, stainless steel and the like, which are used in electrochemical reactions; electrodes of conducting materials similar to said metals and of carbon material; and so forth.

In the electrolytic polymerization of the present invention, the basic operation and means can be according to the methods disclosed in, for example, "Conducting Polymer Materials" edited by Hiroyuki Sasabe and published by CMC in 1983, "New Conducting Polymer materials" edited by Hiroyuki Sasabe and published by CMC in 1987, and "Handbook of conducting Polymers" [T. A. Skotheim (ed.), Marcel Dekker, New York, 1986].

In the present invention, the electrolytic polymerization operation can be conducted by an electrolytic polymerization process wherein a symmetrical voltage is applied so that the potential difference, i.e., the voltage between the two electrodes, changes alternately between positive and negative with the lapse of time and the time period of positive voltage is long. It is possible to apply an asymmetrical voltage. In this process, the electric current during electrolysis repeats a cycle of zero→positive→zero→negative→zero, and electrolytic polymerization takes place in the period of zero→positive→zero. In this period, not only electrolytic polymerization proceeds but also there takes place the doping of the polypyrrole which was subjected to undoping in the previous period. Therefore, when the period of positive voltage is long, the two reactions of polymerization and doping can proceed sufficiently. In the period of zero→negative→zero, the above polymerization does not take place and undoping takes place. By the above operation, the anion of the supporting salt repeats undoping and doping, whereby passages for ionic diffusion are effectively formed in the polypyrrole shaped material.

The potential applied during electrolytic polymerization is at least the oxidizing potential of the monomer used, and undoping is conducted at or below the reducing potential of the polymer formed. The upper limit of potential applied is preferably a potential at least equal to the oxidizing potential for polymerization, in which there occurs no side reaction of the monomer, solvent, supporting salt, etc. The polymerization potential applied during electrolysis is 0.7-1.5 V (against Ag-/AgCl), preferably 0.8-1.2 V, and the undoping potential is −1.5 to −0.3 V, preferably −1.0 to −0.4 V. Hence, the potential and the retention time thereof can be set in view of the balance between polymer formation and ionic outflow and inflow. Such an operation in which the potential applied to the anode is varied between a polymerization potential and an undoping potential with the lapse of time, is hereinafter called "increase and decrease of potential".

The waveform of the potential applied to the anode has no particular restriction. However, a rectangular wave, a triangular wave, a sine wave or a mixed wave is used generally.

In the present invention, the electrolytic polymerization can also be conducted by an electrolytic polymerization process wherein electricity is passed between the two electrodes so that it changes alternately between positive electric current and negative electric current with the lapse of time and the time period of positive electric current is long. It is possible to apply an asymmetrical voltage. In this process, the electric current during electrolysis repeats a cycle of zero→positive→zero→negative→zero, and electrolytic polymerization takes place during the time period of positive electric current. In this period, not only electrolytic polymerization proceeds but also there proceeds the doping of the polypyrrole which was subjected to undoping in the previous period of negative electric current. Hence, when the period of positive electric current is lengthened, the two reactions of polymerization and doping can proceed sufficiently during the period. During the period of zero→negative→zero, the above polymerization does not take place and undoping takes place. By the above operation, the anion of the supporting salt repeats undoping and doping, whereby passages for satisfactory diffusion of anion can be formed in the polypyrrole shaped material.

The positive electric current used during electrolytic polymerization is 0.01 mA/cm$^2$ to 100 mA/cm$^2$, preferably 0.05 mA/cm$^2$ to 50 mA/cm$^2$ in terms of current density at the anode. When the current density of positive electric current is larger than the above range, the anode potential is too high, which may invite side reactions of the monomer, solvent, supporting salt, etc. Meanwhile, when the current density is smaller than the above range, the time period for polymerization is too long, incurring significant reduction in productivity. The negative electric current used during electrolytic polymerization is 0.01 mA/cm$^2$ to 100 mA/cm$^2$, preferably 0.05 mA/cm$^2$ to 50 mA/cm$^2$ in terms of current density at the anode. When the current density of negative electric current is larger than the above range, the undoping of anion is insufficient. Meanwhile, when the current density of negative electric current is smaller than the above range, the time required for undoping is long, inviting significant reduction in productivity of polypyrrole shaped material. Hence, similarly to the case of potential increase or decrease, the potential and the retention time thereof can be set in view of the balance between polymer formation and ionic outflow and inflow. The waveform of electric current applied between the two electrodes has no particular restriction. However, a rectangular wave, a triangular wave, a sine wave or a mixed wave is used generally.

The polymerization temperature is preferably in the range of −50° to +50° C., preferably −40° to +30° C. when the temperature is lower than the above range, the viscosity of the polymerization system increase, which increases the voltage between electrodes too much and easily invites side reactions. Therefore, such a temperature is not preferable. Meanwhile, when the temperature is higher than the above range, side reactions take place easily, and such a temperature is not preferable.

The film thickness formed per one cycle of electrolytic polymerization and undoping treatment is 0.1–50 μm, preferably 0.3–30 μm, particularly preferably 0.5–15 μm.

By thus repeating a cycle consisting of electrolytic polymerization and an undoping treatment, a polypyrrole shaped material can be formed in which a polypyrrole is doped with the anion of a supporting salt and which has a thickness suitable for use as an electrode for polymer secondary battery.

Thus, by repeating a cycle of electrolytic polymerization and undoping, the present process enables production of a polypyrrole shaped material for a secondary battery, wherein the diffusion of counter ion into polymer film inside is easy.

The cycle of electrolytic polymerization and an undoping treatment is preferably 10–10,000 seconds/cycle. When the cycle of electrolytic polymerization and an undoping treatment is shorter than 10 seconds/cycle, the substitution reaction of anion does not take place sufficiently and there take place insufficient outflow and inflow of counter ions. Meanwhile, when the cycle is longer than 10,000 seconds/cycle, the time in the cycle at which the potential is kept at the oxidizing potential is long, increase the polymer thickness formed per one cycle and making difficult the outflow and inflow of anion from and into the polymer.

The anion constituting the polypyrrole shaped material is released from the shaped material by the undoping treatment. The releasability depends upon the microstructure of the polypyrrole shaped material. Not all the anion molecules have the same releasability and anion molecules of high releasability are released.

The thus formed polypyrrole shaped material has a thickness suitable for use as an electrode for a secondary battery, i.e. 50 μm to 2,000 μm, preferably 100–2,000.

Then, in the polymer shaped material, the anion of the supporting salt is, as necessary, replaced with an anion (counter ion) having an ionic size smaller than that of the former anion, whereby a preferred polypyrrole shaped material of the present invention can be obtained.

As to the difference in ionic size between the anion of the supporting salt and the counter ion having a smaller ionic size, used in the above treatment, a larger difference is best.

The anion having an ionic size smaller than that of the anion of the supporting salt, is an ion having an ionic size of 8 Å or smaller, preferably 7 Å or smaller and a molecular weight of 150 or less. As such an anion, there can be mentioned $NO_3^-$, $HSO_4^-$, $BF_4^-$, $PF_6^-$, $CF_3SO_3^-$ and $ClO_4^-$. $BF_4^-$, $PF_4^-$ and $ClO_4^-$ which are particularly preferable in view of the electrolyte used in secondary batteries.

The cell properties of the polypyrrole shaped material can be evaluated by making the measurement of chlorine or fluorine concentration and distribution thereof for the $ClO_4^-$ or $BF_4^-$ taken into the shaped material for replacement. When the chlorine or fluorine analysis is impossible for a polypyrrole shaped material containing an anion other than those mentioned above, the anion is replaced with $ClO_4^-$ or $BF_4^-$ beforehand and then the measurement of chlorine or fluorine concentration and distribution thereof can be made.

As the method for replacing the anion of the supporting salt with an anion (counter ion) having an ionic size smaller than that of the former anion, there can be mentioned two methods, i.e. a method of increasing and decreasing the potential applied to a polypyrrole shaped material in an electrolytic solution containing an anion for replacement, and a simple dipping method.

In the method of increasing and decreasing the potential, the above-mentioned electrolytic solution used during the polymerization is replaced by an electrolytic solution containing an anion for replacement, and the increase and decrease of potential are repeated 5–10 times at the same potential increase and decrease speed as employed during the polymerization, between the upper limit potential of 1.0 V to 1.5 V (against Ag-/AgCl) and the lower limit potential of −1.0 V to −1.5 V (against Ag/AgCl).

The dipping method is conducted by dipping a polymer shaped material in an electrolytic solution containing a replacing ion. The amount of the electrolyte in the electrolytic solution must be at least an ionic amount corresponding to the anion contained in the polymer dipped in the solution and is preferably at least 5-fold such an amount, more preferably at least 10-fold. The electrolytic solution may be stirred using a shaker, an ultra-sonic oscillator or the like, or may not be stirred. The dipping temperature is preferably high in order to accelerate ion exchange. Too high a temperature, however, invites undesirable reactions such as side reactions and the like; therefore, the appropriate dipping temperature is 100° C. or lower, preferably 50° C. or lower. The dipping time required for all ions in polymer to be replaced, depends upon the dipping conditions. The dipping time used is generally 1 hour to 100 hours, preferably 2 hours to 50 hours.

As above, the anion in polypyrrole is ion-exchanged with a counter ion having a smaller ionic size. This is presumed to occur because the increase and decrease of potential during polymerization brings about the forcible repetition of diffusion of anions in the polymer film and thereby passages for ionic movement of anionic size are formed throughout the whole thickness of the film. Since these passages facilitate ions exchange with counter ion of smaller ionic size, at least 50% of the anions in the polypyrrole shaped material of the present invention is replaced by the above-mentioned electrochemical or chemical treatment. The ion exchange amount depends upon the conditions of application of polymerization potential and can be increased by lowering the reducing potential or by decreasing the polymer thickness formed per one cycle. The ion exchange amount can also be increased by increasing the time period in which the negative electricity flows between electrodes in the electrolytic polymerization cycle.

The above-obtained polypyrrole in which the anion of the supporting salt taken into during polymerization has been ion-exchanged with a counter ion of smaller ionic size, was evaluated for cell properties as follows. That is, a tri-electrode cell was assembled using the polypyrrole as a positive electrode, platinum as a negative electrode and a lithium metal as a reference electrode (an Ag/AgCl electrode was used as an auxiliary reference electrode). A solution obtained by dissolving 1M LiClO$_4$ in propylene carbonate was used as an electrolytic solution. The cell was subjected to discharging at different current densities as well as to controlled-potential charging at 3.6 V (against Li/Li+, this potential corresponds to 0.6 V against Ag/AgCl). Since the reference electrode of lithium metal is generally unstable to air and water, an Ag/AgCl reference electrode was used in combination. In the Examples, each potential was indicated as a potential against a Ag/AgCl reference electrode.

EFFECTS OF THE INVENTION

The present invention can provide a polypyrrole shaped material which enables charging and discharging at high current densities and which can be made into a secondary battery having high charging and discharging capacities.

EXAMPLES

The present invention is hereinafter described in more detail referring to Examples. However, the present invention is not restricted to the Examples.

EXAMPLE 1

0.1M pyrrole as monomer and 0.1M tetraethylammonium p-toluenesulfonate were dissolved in propylene carbonate containing 1% of water, to prepare an electrolytic solution. A combination of this electrolytic solution, a platinum plate as anode and a platinum foil as counter electrode was used as a polymerization cell.

Figure 1:
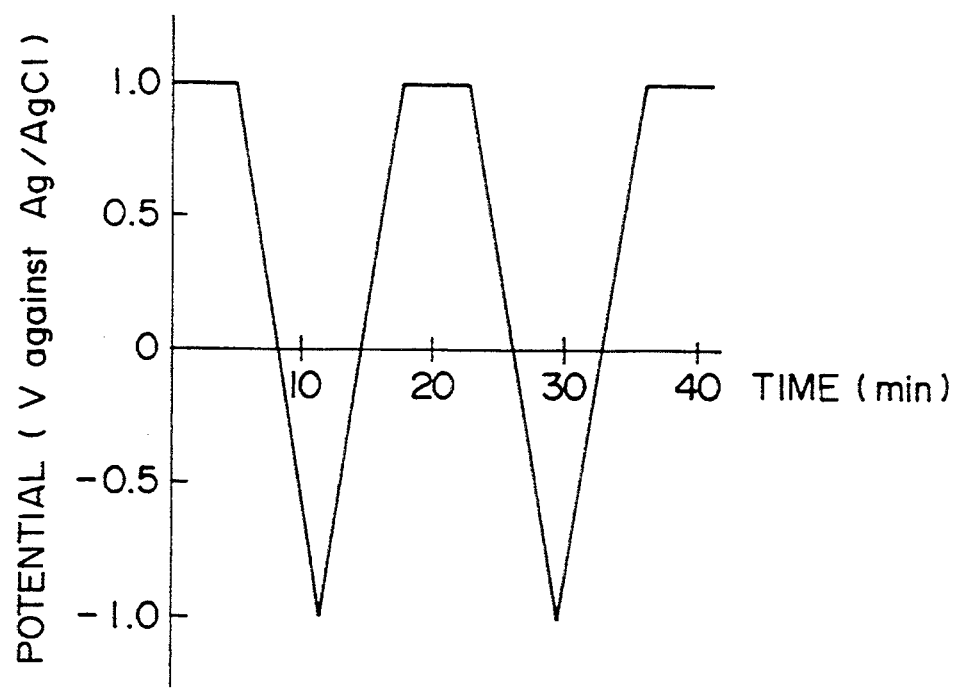
FIG. 1 is the wave form of the potential applied to an anode in production of a polypyrrole film by electrolytic oxidizing polymerization in Example 1 of the present invention.

Then, in accordance with the wave form shown in FIG. 1, the anode potential was kept at an upper limit of 1.0 V (against Ag/AgCl) for 300 seconds per one cycle to conduct polymerization; the potential was swept at an increasing and decreasing rate of 5 mV/sec; the potential was kept at a lower limit of −1.0 V (against Ag/AgCl) for zero second; the potential was again swept to the upper limit at an increasing temperature of 5 mV/sec; with the anode potential being increased and decreased as above, electrolytic oxidizing polymerization was conducted until a polypyrrole film of 100 μm in thickness was formed on the platinum plate (number of potential increases and decreases=10 cycles).

Thereafter, the electrolytic solution used for the polymerization was replaced by propylene carbonate containing 1.0M lithium perchlorate, and an counter ion exchange operation was conducted in which the counter ion (TsO−) in the polypyrrole shaped material was exchanged with ClO$_4$− by an electrochemical method. The ion exchange was conducted by using a triangular wave as a wave for potential increase and decrease, an upper potential limit of 1.5 (V (against Ag/AgCl) and a lower potential limit of −1.5 V (against Ag/AgCl) per one cycle, and the same potential-increasing and decreasing rate of 5 mV/sec as in the polymerization. The potential-increasing and decreasing cycle was repeated 5 times. Next, a tri-electrode cell was prepared by using the resulting polypyrrole film with the platinum plate as a positive electrode, a platinum foil as a negative electrode, a lithium metal as a reference electrode (an Ag/AgCl electrode was used as an auxiliary reference electrode) and, as an electrolytic solution, a solution obtained by dissolving 1M LiClO$_4$ in propylene carbonate. The cell was subjected to discharging at a current density of 10 mA/cm$^2$ and controlled-potential charging at 0.6 V (against Ag/AgCl).

Figure 2:
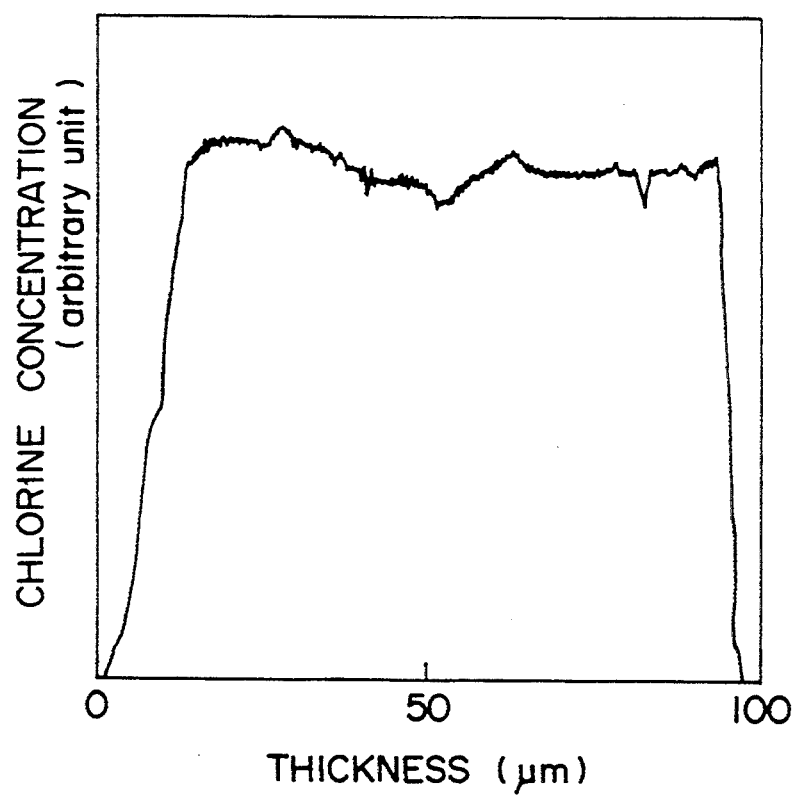
FIG. 2 is a diagram showing the chlorine distribution in the thickness direction of a polypyrrole film, as measured by an X-ray microanalyzer, in Example 1.

The resulting film was measured for the distribution of counter ion in the thickness direction by analyzing chlorine by an X-ray microanalyzer. As a result, at the completion of the charging, chlorine was present almost uniformly even in the thickness direction, as shown in FIG. 2; the distribution of chlorine was 13%; and the ClO$_4$−-reduced ionic concentration was 3.1×10$^{-3}$ mole/g resin. At the completion of the discharging, chlorine concentration was 14% or less of that at the completion of the charging. From these results, it is presumed that about 85% of the anion (p-toluenesulfonic acid ion) taken in during polymerization was replaced by $ClO_4^-$.

Figure 3:
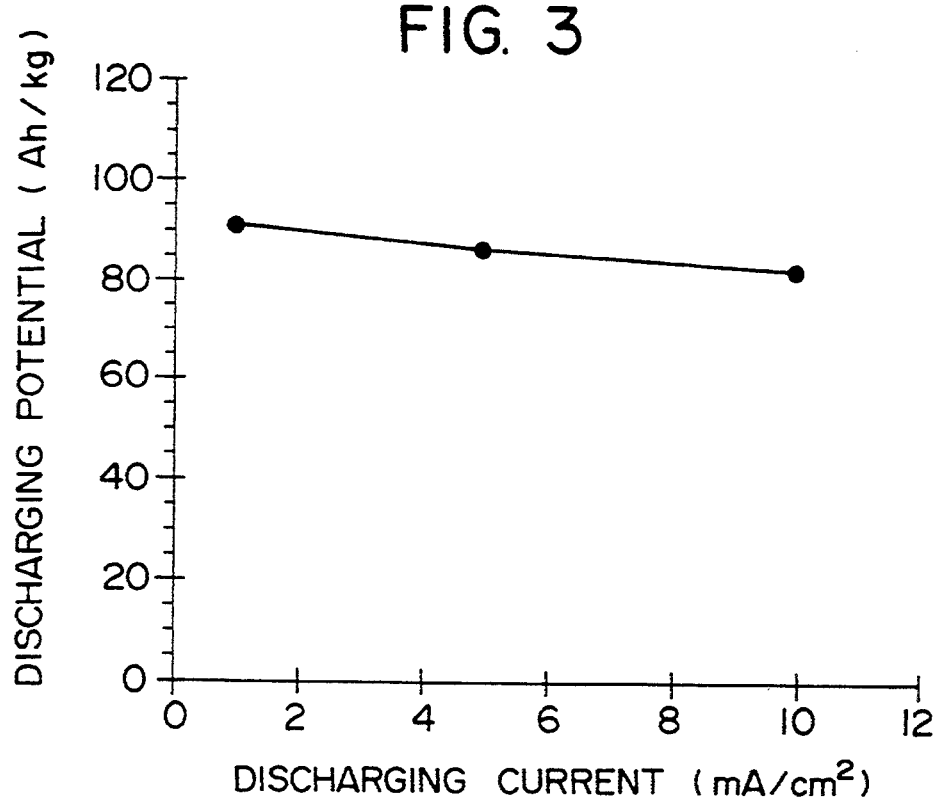
FIG. 3 is a graph showing the relationship between discharging current and discharging capacity in a secondary battery using a polymer electrode according to the present invention, in Example 1.

Further, the tri-electrode cell was used for measuring cell properties. In the measurement of cell properties, charging was conducted for 1 hour at a controlled positive electrode potential of 0.6 V (against Ag/AgCl); then, discharging was conducted at controlled electric currents of 1-10 mA/cm$^2$ until the positive electrode potential became $-1.0$ V (against Ag/AgCl), to examine the change in discharging capacity. The result is shown in FIG. 3. As is clear from FIG. 3, the discharging capacity per unit weight (i.e. discharging capacity density) at a discharging current density of 1 mA/cm$^2$ was 91 Ah/kg and was very high. Further, a discharging capacity density of 82 Ah/kg was obtained even at a high discharging current density of 10 mA/cm$^2$.

Incidentally, at the weight used for calculation of discharging capacity density, there was used a weight calculated from the quantity of electricity required for polymerization, based on an assumption that the number of the counter ions contained in the polypyrrole shaped material is 0.33 per pyrrole monomer unit.

EXAMPLE 2

By repeating the procedure of Example 1 except that the lower potential limit during polymerization was changed to $-0.6$ V (against Ag/AgCl), there was obtained a polypyrrole film in which the p-toluenesulfonic acid ion taken in during polymerization had been replaced by $ClO_4^-$.

The polypyrrole film was assembled into a tri-electrode cell in the same manner as in Example 1. The cell was subjecting to discharging at a current density of 10 mA/cm$^2$ and controlled-potential charging at 0.6 V (against Ag/AgCl).

Figure 4:
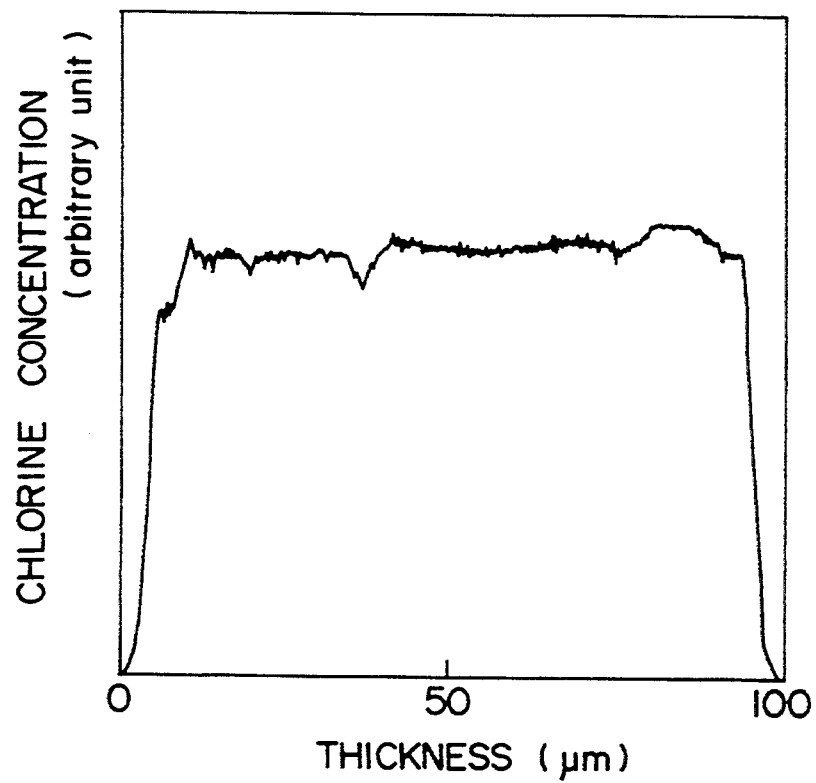
FIG. 4 is a diagram showing the chlorine distribution in Example 2, similar to that of FIG. 2.

The resulting film was analyzed for counter ion distribution in the thickness direction by an X-ray microanalyzer. As a result, at the completion of the charging, the chlorine distribution in the thickness direction was almost uniform even in the film thickness direction, as shown in FIG. 4; the chlorine distribution was 8%; and the $ClO_4^-$-reduced ionic concentration was $2.6\times 10^{-4}$ mole/g resin. Further, chlorine concentration at the completion of the discharging was 28% or less.

Figure 5:
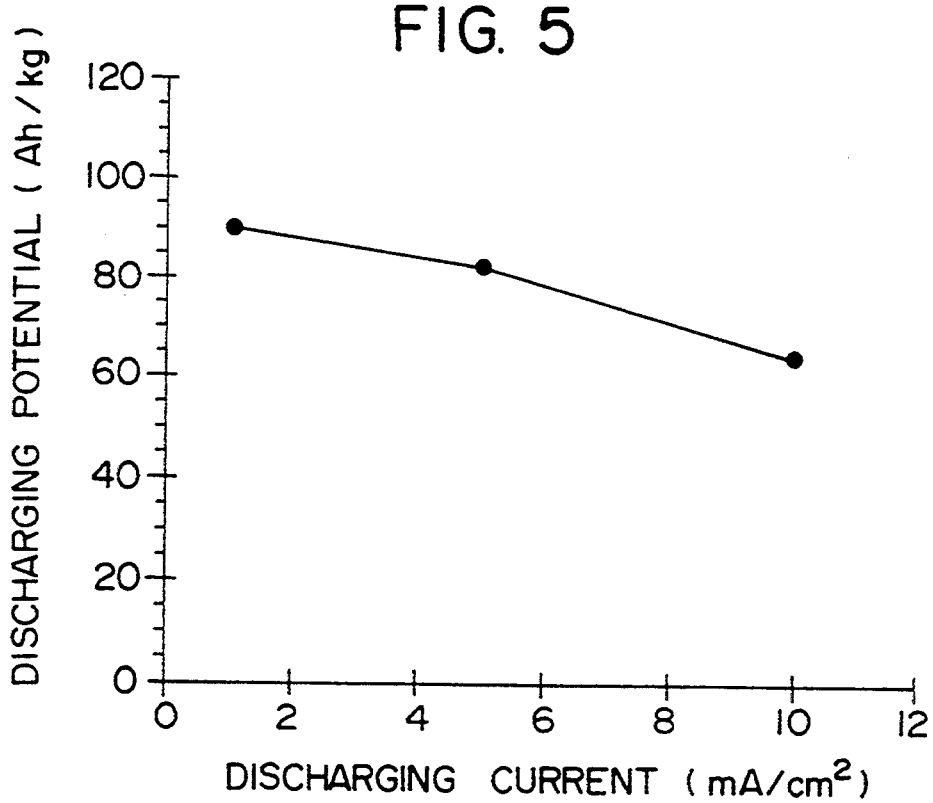
FIG. 5 is a graph showing the relationship between discharging current and discharging capacity in Example 2.

Also, the tri-electrode cell was used for cell properties. In the measurement of cell properties, charging was conducted for 1 hour at a controlled positive electrode potential of 0.6 V (against Ag/AgCl); then, discharging was conducted at controlled currents of 1-10 mA/cm$^2$ until the positive electrode potential became $-1.0$ V (against Ag/AgCl), to examine changes in discharging capacity. The result is shown in FIG. 5. As is clear from FIG. 5, the discharging capacity per unit weight (i.e. discharging capacity density) at a discharging current density of 1 mA/cm$^2$ was 90 Ah/kg and very high.

Further, a discharging capacity density of 64 Ah/kg was obtained even at a high discharging current density of 10 mA/cm$^2$. When charging and discharging were repeated 100 times under the above conditions, the ratio of discharging capacity density to charging capacity density, i.e., the coulomb efficiency was maintained at about 95%, and there was seen no significant reduction in charging and discharging capacities.

COMPARATIVE EXAMPLE 1

Counter ion exchange for polypyrrole was conducted in the same manner as in Example 1 except that controlled-potential polymerization was conducted at an anode potential of 1.0 V (against Ag/AgCl) in the polymerization system of Example 1 until a film thickness of 100 μm was obtained.

The film was analyzed by an X-ray microanalyzer. As a result, sulfuratoms in the p-toluenesulfonic acid ion taken in during polymerization were detected in a large amount; however, chlorine atoms in $ClO_4^-$ used for exchange were present in a large amount on the film surface and in its vicinity; thus, only part of the p-toluenesulfonic acid ion was exchanged.

As in Example 1, the film was assembled into a tri-electrode cell, and there was measured the chlorine distribution and concentration in the film after the charging and discharging of the cell. At the completion of the charging, the chlorine concentration was high in the vicinity of the film surface and substantially no chlorine was detected in the film portions 30 μm or more within the surface. At the completion of the discharging, substantially no chlorine was detected even in the vicinity of the surface. The $ClO_4^-$-reduced ionic concentration was $0.3\times 10^{-3}$ mole/g resin at the completion of the discharging and $1.1\times 10^{-3}$ mole/g resin at the completion of the charging.

The discharging capacity density at a discharging current density of 1 mA/cm$^2$ was as low as 28 Ah/kg, and that at a large discharging current density of 10 mA/cm$^2$ was even lower (21 Ah/kg). These indicate that when the applied potential is neither increased nor decreased and polymerization is conducted at a controlled potential as in ordinary cases, counter ion exchange takes place only slightly and the charging and discharging occurring with the outflow and inflow of counter ion do not take place effectively. Although the discharging capacity per unit weight was small, the ratio of discharging capacity to charging capacity, i.e., the coulomb efficiency, was almost 100%. That is, although the proportion of outflowing and inflowing counter ion is small, charging and discharging take place 100% under that condition.

COMPARATIVE EXAMPLE 2

Using the same polymerization system as in Example 1, controlled-current polymerization at a current density of 5 mA/cm$^2$ was conducted in place of a polymerization by application of a symmetrical voltage, whereby a polypyrrole film of 100 μm in thickness containing a p-toluenesulfonic acid ion as a counter ion was obtained. Subsequently, the film was subjected to counter ion exchange with $ClO_4^-$ in the same manner as in Example 1. Analysis by x-ray microanalyzer indicated that the ionic exchange reaction occurred only in the vicinity of the film surface and only p-toluenesulfonic acid ion was present in the film inside.

Figure 6:
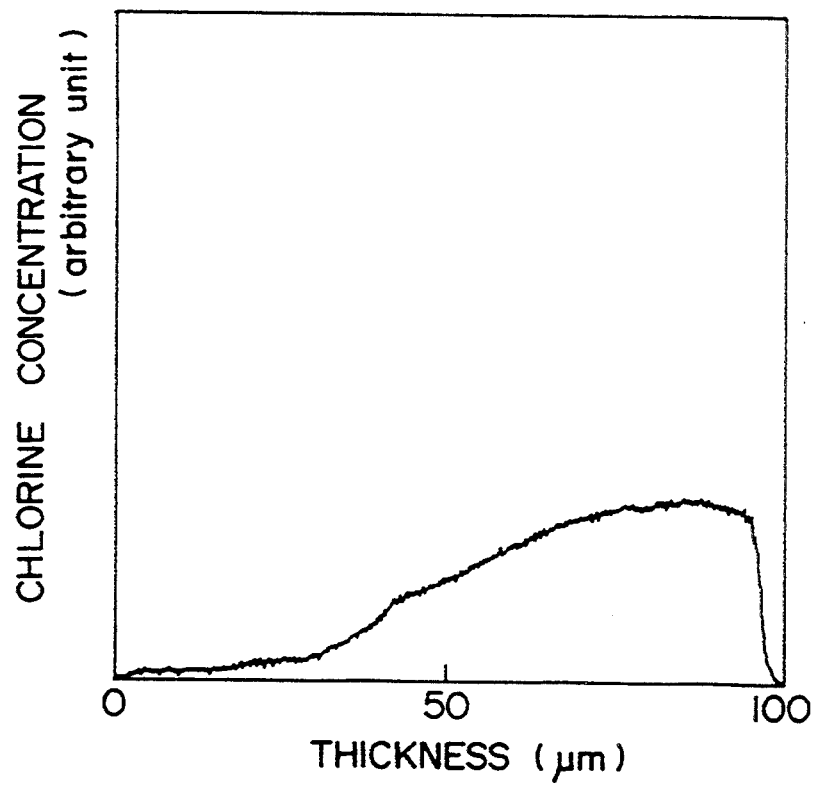
FIG. 6 is the diagram showing a chlorine distribution in Comparative Example 2, similar to that of FIG. 2.

The film was assembled into a tri-electrode cell in the same manner as in Example 1, and the chlorine distribution during charging and discharging were measured under the same conditions as in Example 1. The chlorine distribution at the completion of the charging is shown in FIG. 6. The $ClO_4^-$-reduced ionic concentration was $0.1\times 10^{-3}$ mole/g resin at the completion of the discharging and $0.1\times 10^{-3}$ mole/g resin at the completion of the charging. Since the $ClO_4^-$ concentrated in the vicinity of the film surface even at the completion of the charging, the chlorine distribution was as large as 91%.

The cell was used for cell properties. The discharging capacity density at 1 mA/cm² was only 26 Ah/kg and that at 10 mA/cm² was only 23 Ah/kg.

COMPARATIVE EXAMPLE 3

A tri-electrode cell was prepared. In the cell, the positive electrode was a combination of a platinum plate and a polypyrrole film obtained by the polymerization of Example 1, which contained a p-toluene-sulfonic acid ion as a counter ion but was not subjected to counter ion exchange; the negative electrode was a platinum foil; the reference electrode was Ag/AgCl; and the electrolytic solution was a solution obtained by dissolving 1M lithium p-toluenesulfonic in propylene carbonate. The cell was used for cell properties of polypyrrole. The measurement for cell properties of polypyrrole was made by conducting charging for 1 hour at a controlled positive electrode potential of 0.6 V (against Ag/AgCl), subsequently conducting discharging at controlled currents of 1-10 mA/cm² until the positive electrode potential became $-1.0$ V, and examining changes in discharging capacity. As a result the discharging capacity density at a discharging current of 1 mA/cm² was 21 Ah/kg and that at 10 mA/cm² was 16 Ah/kg; thus, the discharging capacity densities obtained were all low.

COMPARATIVE EXAMPLE 4

A polypyrrole was produced by electrolytic oxidizing polymerization until it had a film thickness of 100 μm, under the same conditions as in Example 1 except that tetraethylammonium perchlorate was used in place of the tetraethylammonium p-toluenesulfonate used in the polymerization of Example 1.

Then, a tri-electrode cell was assembled in the same manner as mentioned above, and measured for chlorine distribution and concentration under the same conditions as in Example 1. The chlorine concentration was low only at the film surface at the completion of the discharging and, at the completion of the charging, was almost uniform throughout the film thickness. The $ClO_4^-$-reduced ionic concentration was $2.2 \times 10^{-3}$ mole/g resin at the completion of the discharging at 1 mA/cm² and $3.4 \times 10^{-3}$ mole/g resin at the completion of the charging. In this Comparative Example, unlike the cases of Example 1 and Comparative Examples 1 and 2, only $ClO_4^-$ was used as the anion; therefore, it is indicated that 0.3 $ClO_4^-$ as contained per one pyrrole at the completion of the charging. The anion concentration was low at the completion of the discharging as compared with that the completion of the charging, but the extent of the decrease was small, which indicates that insufficient outflow of the anion occurred during the discharging.

The discharging capacity densities of the cell at discharging current densities of 1 mA/cm² and 10 mA/cm² were 35 Ah/kg and 13 Ah/kg, respectively, both of which were not high. This indicates that even if the increase and decrease of potential is employed, no high discharging capacity is obtained unless there is ion exchange of large counter ion with small counter ion as in the present invention.

EXAMPLE 3

A polypyrrole film of 800 μm in thickness containing a p-toluenesulfonic acid ion as a counter ion was produced in the same manner as in Example 1. Subsequently, the film was subjected to counter ion exchange with $ClO_4^-$.

The resulting film was assembled into a trielectrode cell in the same manner as in Example 1. The cell was measured for chlorine distribution and concentration. The $ClO_4^-$-reduced ionic concentration was $2.9 \times 10^{-3}$ mole/g resin at the completion of the discharging and $0.4 \times 10^{-3}$ mole/g resin at the completion of the charging. The chlorine distribution in the film thickness direction at the completion of the charging was almost even.

Figure 7:
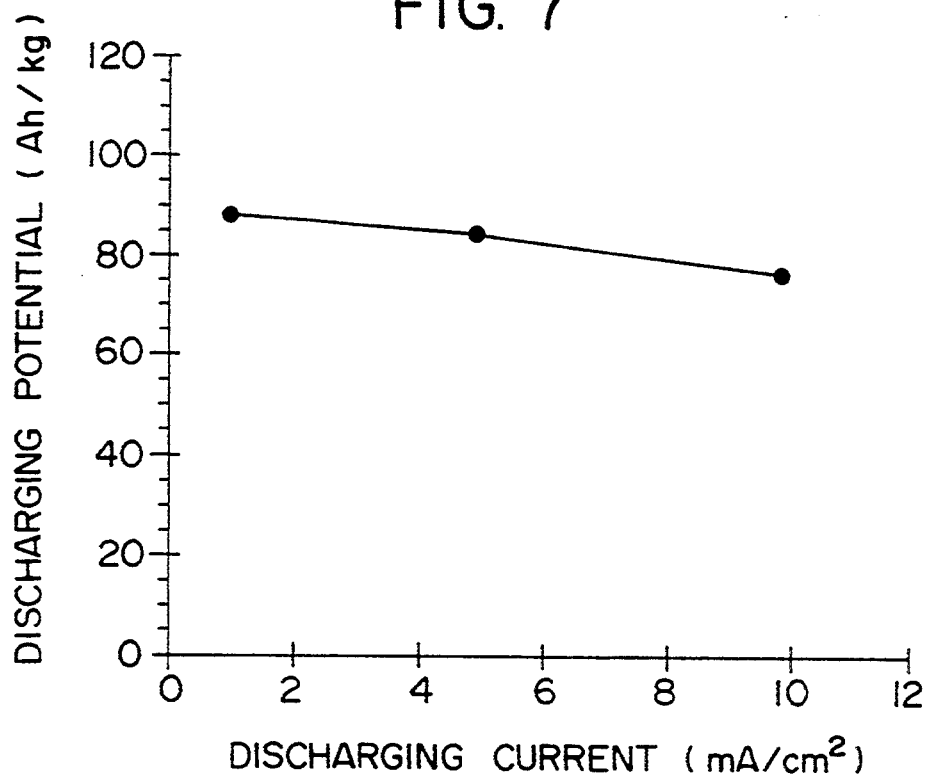
FIG. 7 is a graph showing the relationship between discharging current and discharging capacity in a secondary battery using a polymer electrode according to the present invention, in Example 3.

The relation of discharging capacity density to discharging current density is shown in FIG. 7. As is clear from FIG. 7, the discharging capacity density was as high as 88 Ah/kg at 1.0 mA/cm², and was also high (77 Ah/kg and 67 Ah/kg) even at 10 mA/cm² and 20 mA/cm², respectively.

COMPARATIVE EXAMPLE 5

0.1M pyrrole as monomer and 0.1M tetraethylammonium perchlorate were dissolved in propylene carbonate to prepare an electrolytic solution. In this electrolytic solution were dipped a platinum plate as an anode and a platinum foil as a counter electrode to prepare a polymerization cell. Then, controlled-current polymerization at a current density of 5 mA/cm² was conducted to produce two polypyrrole films of 10 μm and 800 μm in thickness, each containing $ClO_4^-$. Each film was assembled into a tri-electrode cell in the same manner as in Example 1. Each cell was used for cell properties. As a result, the discharging capacity densities of the cells at 1 mA/cm² were 92 Ah/kg and 25 Ah/kg, respectively, and the discharging capacity densities at 10 mA/cm² were 75 Ah/kg and 16 Ah/kg, respectively. This indicates that with the film obtained by the conventional controlled-current method, a high discharging capacity density can be obtained when the film thickness is as small as about 10 μm, but only a very low discharging capacity density is obtained when the film thickness is as large as about 800 μm.

EXAMPLES 4-6

The procedure of Example 1 was repeated except that the tetraethylammonium p-toluenesulfonate used in Example 1 was changed to tetraethylammonium β-naphthalenesulfonate (Example 4), tetraethylammonium p-tert-butylbenzenesulfonate (Example 5) and triethylammonium of dimethyl 5-sulfoisophthalate (Example 6), whereby polypyrrole films each having a film thickness of 100 μm and containing the corresponding anion were produced. Subsequently, each film was subjected to counter ion exchange with $ClO_4^-$.

Each of the resulting films was assembled into a tri-electrode cell. Each cell was measured for chlorine distribution and concentration in the same manner as in Example 1.

Figure 8:
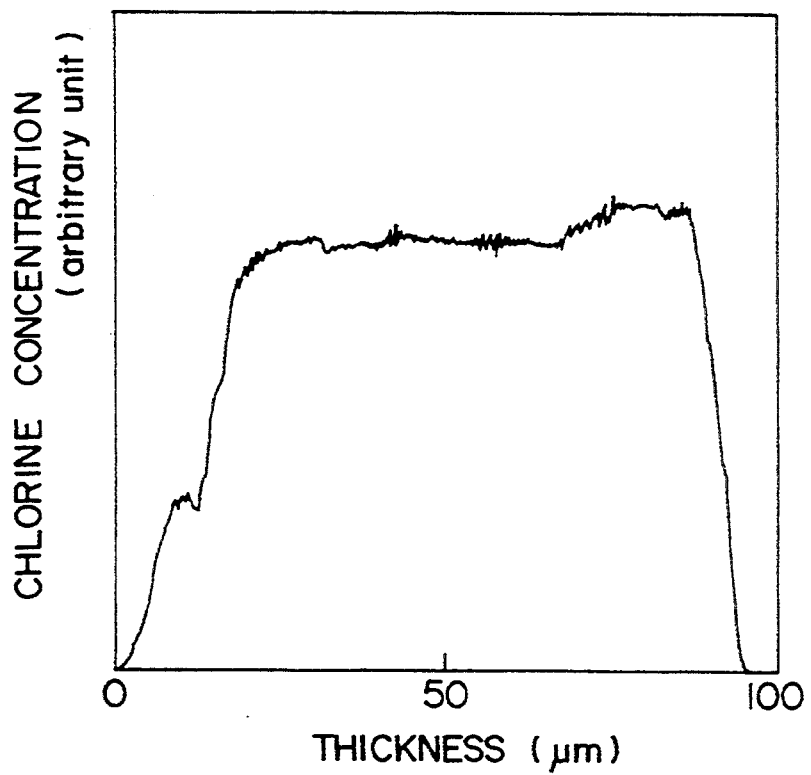
FIGS. 8–10 are diagrams showing chlorine distributions in Examples 4–6, respectively, similar to that of FIG. 2.
Figure 9:
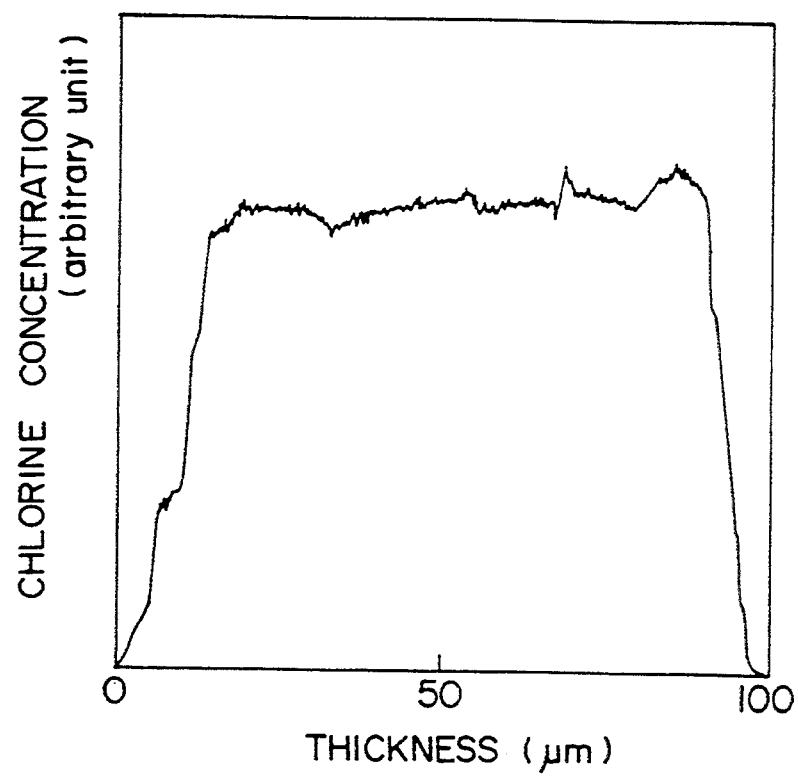
Figure 10:
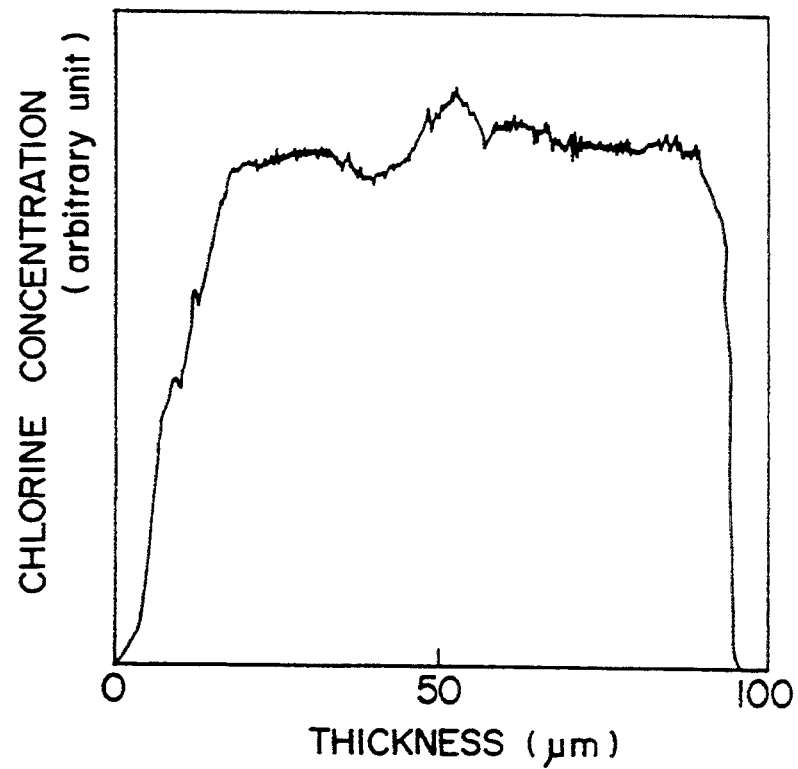

The chlorine distributions at the completion of the charging were as shown in FIGS. 8-10 (FIG. 8 is for Example 4, FIG. 9 is for Example 5 and FIG. 10 is for Example 6). In each case, the chlorine distribution in the thickness direction was 15% or less and even and the $ClO_4^-$-reduced ionic concentration was $2.8 \times 10^{-3}$ mole/g resin or more. The chlorine concentrations at the completion of the discharging were 20% or less of those at the completion of the charging.

The results of the measurement of the cell properties of the individual films are shown in Table 1.

Each film showed high cell properties similarly to the cases of Examples 1–3 of the present invention using p-toluenesulfonic acid ion.

TABLE 1

| Example | Counter ion during polymerization | Counter ion for exchange | Discharging capacity (Ah/kg) | |
|---|---|---|---|---|
| | | | 1 mA/cm$^2$ | 10 mA/cm$^2$ |
| 4 | C$_{10}$H$_6$SO$_3^-$ | ClO$_4^-$ | 91 | 80 |
| 5 | t-(CH$_3$)$_3$CC$_6$H$_4$SO$_3^-$ | ClO$_4^-$ | 92 | 87 |
| 6 | 3,5-(CH$_3$OCO)$_2$C$_6$H$_3$SO$_3^-$ | ClO$_4^-$ | 83 | 82 |

EXAMPLE 7

A polypyrrole film of 100 μm in thickness containing p-toluenesulfonic acid ion was obtained by the same polymerization process as in Example 1.

The polypyrrole film was subjected to counter ion exchange under the same conditions as in Example 1 except that there was used, as the electrolytic solution, propylene carbonate containing 0.1M lithium tetrafluoroborate. Then, charging and discharging of cell were conducted under the same conditions as in Example 1 except that LiBF$_4$ was used in place of LiClO$_4$.

The distribution of counter ion (BF$_4^-$) in the thickness direction of the resulting film was examined by fluorine analysis using an X-ray microanalyzer. As a result, the fluorine distribution in the thickness direction at the completion of the charging was 20% or less and almost uniform even in the thickness direction.

With respect to the cell properties, the discharging capacity per unit weight (discharging capacity density) at a discharging current density of 1 mA/cm$^2$ was 93 Ah/kg and was very high. Also, a discharging capacity density of 78 Ah/kg was obtained even at a high discharging current density of 10 mA/cm$^2$.

We claim:

1. A polypyrrole shaped material having a film thickness of about 100 μm to about 2,000 μm, characterized in that when the polypyrrole shaped material is assembled into a tri-electrode cell comprising the polypyrrole shaped material as a positive electrode, platinum as a negative electrode, a lithium metal as a reference electrode and LiClO$_4$ or LiBF$_4$ as an electrolyte and said tri-electrode cell is subjected to discharging at a current density of 10 mA/cm$^2$ and controlled-potential charging at 3.6 V, (i) at the completion of the discharging, the concentration of chlorine or fluorine in the polypyrrole shaped material is 30% or below of that at the completion of the charging, and
   (ii) at the completion of the charging, the distribution of chlorine or fluorine concentration in the thickness direction of the polypyrrole shaped material, defined by the following formula is 50% or less:

distribution of chlorine or fluorine
   concentration = [($I$max − $I$min)/$I$max] × 100(%)

wherein $I$max is the maximum chlorine or fluorine concentration in the thickness direction of the shaped material, and $I$min is the minimum chlorine or fluorine concentration in the thickness direction of the shaped material.

2. A polypyrrole shaped material according to claim 1, wherein the chlorine or fluorine concentration in the polypyrrole shaped material at the completion of the charging expressed at the concentration of ClO$_4^-$ or BF$_4^-$, respectively, is at least 1.7×10$^{-3}$ mole/g resin.

3. A process for producing a polypyrrole shaped material, which is characterised by
   (a) dipping an electrode substrate in a solution containing pyrrole and a supporting salt consisting of a cation and an anion having a molecular weight of 150 or more and an ionic size of at least 8 Å, and conducting electrolytic polymerization to form a thin film on the substrate,
   (b) then conducting an undoping treatment at a potential not higher than a reducing potential of the polymer formed in (a) to release the anion of the supporting salt,
   (c) and repeating the thin film formation by electrolytic polymerization of the step (a) and the undoping treatment of the step (b) at least 2 times to form a polypyrrole shaped material on the substrate.

4. A process according to claim 3, wherein the electrolytic polymerization is conducted by applying voltage so that the voltage changes alternately between positive and negative with the lapse of time with the time period of positive voltage being longer than the time period of negative voltage and thereby a polypyrrole shaped material is formed from the solution containing pyrrole and a supporting salt containing an anion having an ionic size of at least 8 Å.

5. A process according to claim 3, which further comprises introducing an anion having an ionic size smaller than that of the anion of the supporting salt into the polypyrrole shaped material to replace the anion derived from the supporting salt.

6. A process according to claim 3, wherein the cycle of the thin film formation by electrolytic polymerization of the step (a) and the undoping treatment of the step (b) is 10–10,000 seconds/cycle.

7. A process according to claim 3, wherein the film thickness formed per one cycle of the thin film formation by electrolytic polymerization of the step (a) and the undoping treatment of the step (b) is in the range of 0.1 μm to 50 μm.

8. A secondary battery using the polypyrrole shaped material of claim 1 as an electrode.

* * * * *